United States Patent
Kuo et al.

(10) Patent No.: US 8,405,658 B2
(45) Date of Patent: Mar. 26, 2013

(54) ESTIMATION OF LIGHT COLOR AND DIRECTION FOR AUGMENTED REALITY APPLICATIONS

(75) Inventors: Eddy Yim Kuo, Concord, CA (US); Brian Anthony Pene, San Francisco, CA (US)

(73) Assignee: AUTODESK, Inc., San Rafael, CA (US)

( * ) Notice: Subject to any disclaimer, the term of this patent is extended or adjusted under 35 U.S.C. 154(b) by 511 days.

(21) Appl. No.: 12/559,352

(22) Filed: Sep. 14, 2009

(65) Prior Publication Data

US 2011/0063295 A1 Mar. 17, 2011

(51) Int. Cl.
*G06T 15/00* (2011.01)

(52) U.S. Cl. ........ 345/426; 345/473; 345/619; 345/632; 345/633; 345/634

(58) Field of Classification Search .................. 345/426, 345/633, 634, 419; 382/103, 154, 284, 131
See application file for complete search history.

(56) References Cited

U.S. PATENT DOCUMENTS

| | | | |
|---|---|---|---|
| 6,765,569 B2 * | 7/2004 | Neumann et al. | 345/419 |
| 7,548,238 B2 * | 6/2009 | Berteig et al. | 345/426 |
| 7,697,141 B2 * | 4/2010 | Jones et al. | 356/445 |
| 2002/0191862 A1 * | 12/2002 | Neumann et al. | 382/284 |
| 2003/0146982 A1 * | 8/2003 | Tindall | 348/223.1 |
| 2005/0179617 A1 * | 8/2005 | Matsui et al. | 345/7 |
| 2005/0225630 A1 * | 10/2005 | Childers et al. | 348/51 |
| 2007/0018980 A1 * | 1/2007 | Berteig et al. | 345/426 |
| 2007/0038944 A1 * | 2/2007 | Carignano et al. | 715/757 |
| 2007/0097213 A1 * | 5/2007 | Ajito | 348/189 |
| 2008/0211813 A1 * | 9/2008 | Jamwal et al. | 345/426 |
| 2009/0109240 A1 * | 4/2009 | Englert et al. | 345/633 |

* cited by examiner

*Primary Examiner* — Said Broome
*Assistant Examiner* — Abderrahim Merouan
(74) *Attorney, Agent, or Firm* — Patterson & Sheridan, LLP

(57) ABSTRACT

One embodiment of the invention sets forth a technique for shading a graphics object inserted into a video feed of a real-world scene based on lighting conditions in the real-world scene. The real-world scene includes a fiducial marker denotes the location in the video feed where the graphics object should be inserted. In order to shade the graphics object, the AR application computes light color values at multiple points on the fiducial marker. The color computation module also computes the direction of light cast on the fiducial marker by determining the direction of the shadow cast by a pyramid object on the fiducial marker. The AR application then shades the graphics object inserted into the video feed at the location of the fiducial marker based on the light color values and the direction of light.

20 Claims, 7 Drawing Sheets

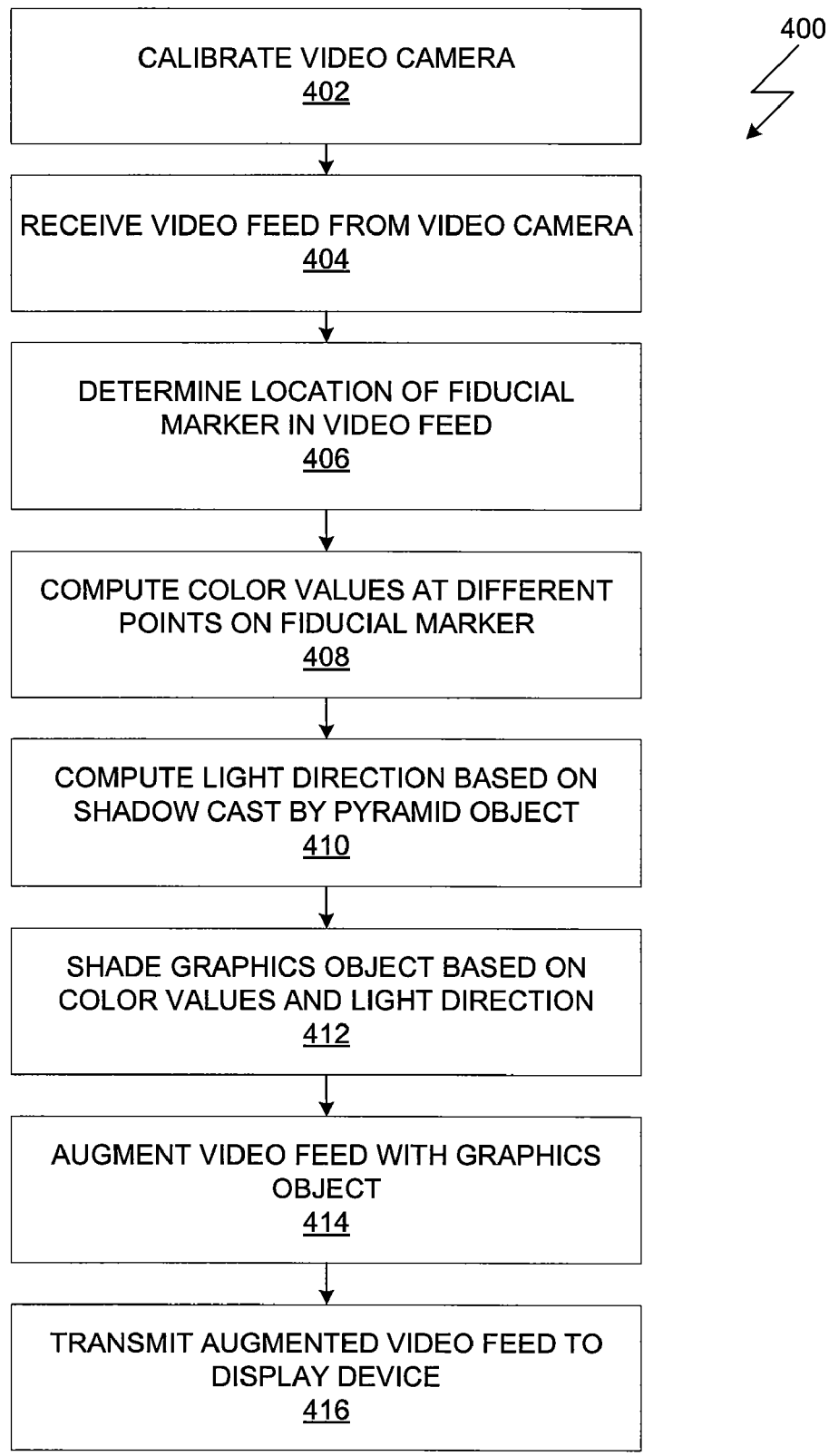

ESTIMATION OF LIGHT COLOR AND DIRECTION FOR AUGMENTED REALITY APPLICATIONS

BACKGROUND OF THE INVENTION

1. Field of the Invention

The invention relates generally to the field of computer software and, more specifically, to estimating light color and direction for augmented reality applications.

2. Description of the Related Art

An augmented reality application is a type of computer software application that is used to digitally enhance real-world video images of a real-world scene captured through a video camera. One aspect of digitally enhancing the video images is inserting computer-generated graphics objects into the video images. By recognizing fiducial markers manually placed in the real-world scene captured by the video images, the augmented reality application determines the location in the video images where the computer-generated graphics objects should be inserted. The video images are then augmented by inserting the computer-generated graphics objects in the video images.

When inserting computer-generated graphics objects into the video images, it is important to shade and adjust the lighting of the computer-generated graphics object based on the lighting conditions in the real-world scene. Traditionally, the shading and the lighting of a computer-generated graphics object is pre-determined before the video image is digitally enhanced. Such a technique requires specialized hardware configured to collect lighting values from the real-world scene before the video image is captured. The lighting values are then processed to determine the lighting conditions in the real-world scene. The augmented reality application then generates the computer-generated graphics object such that the computer-generated graphics object is shaded according to the determined lighting conditions. Once generated, the computer-generated graphics object is inserted into the video images.

One drawback to this technique is that the augmented reality application must process each video image twice, once to determine the lighting conditions and again to digitally enhance the video image. Such an approach is thus computationally inefficient. Another drawback is that the specialized hardware used to determine the lighting conditions can be expensive and difficult to obtain.

As the foregoing illustrates, what is needed in the art is an effective technique for determining lighting conditions in a real-world scene for augmented reality applications.

SUMMARY OF THE INVENTION

One embodiment of the invention sets forth a computer-implemented method for lighting a graphics object inserted into a video image of a real-world scene that includes a fiducial marker and a light source emitting light on the fiducial marker. The method includes the step of analyzing video data associated with the video image to determine a location of the fiducial marker within the real-world scene, computing a color value associated with the light emitted at a first point on the fiducial marker based on a light intensity value associated with the first point and specified by the video data, determining a location of a shadow cast by an object placed on the fiducial marker within the real-world scene by analyzing one or more light intensity values associated with a set of points surrounding the fiducial marker and specified by the video data, computing a direction of the emitted light based on the location of the shadow cast by the object and modifying one or more lighting properties associated with the graphics object based on the color value of the light emitted at the first point and the direction of the emitted light.

One advantage of the disclosed method is that the video feed engine processes the video feed only once to compute lighting conditions, i.e., light color values and the direction of light cast on the fiducial, and inserted the graphics object into the video feed.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a flowchart of method steps for shading a graphics object by computing light color values and direction of light cast on a fiducial marker within a real-world scene, according to one embodiment of the invention.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
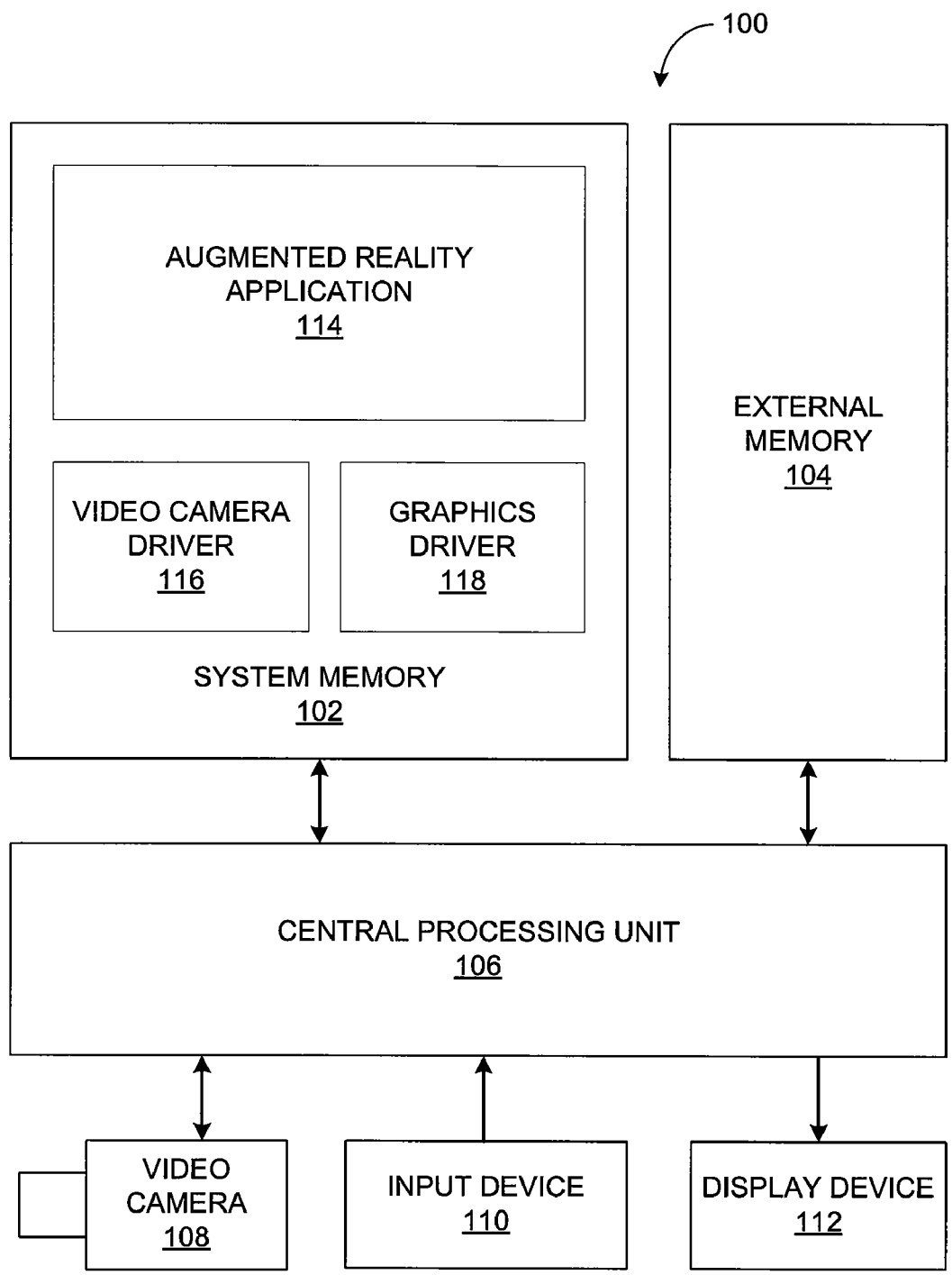
FIG. 1 is a block diagram of a system configured to implement one or more aspects of the invention.

FIG. 1 is a block diagram of a system 100 configured to implement one or more aspects of the invention. As shown, the system 100 includes a system memory 102, an external memory 104, a central processing unit (CPU) 106, a video camera 108, an input device 110 and a display device 112.

The system memory 102 includes an augmented reality (AR) application 114, a video camera driver 116 and a graphics driver 118. The system memory 102 is a memory space, usually a random access memory (RAM), that temporarily stores software programs running within the system 100 at any given time. The AR application 114 is a software program that allows an end-user to digitally enhance video frames of a real-world scene captured via the video camera 108. The video camera driver 116 is a software program that allows the AR application 114 to interface with the video camera 108 for configuring the video camera 108 and receiving the video frames captured by the video camera 108. The graphics driver 118 is a software program that allows the AR application 114 to render augmented video frames on the display device 112 via the CPU 106.

The CPU 106 executes a sequence of stored instructions associated with and/or transmitted from the various elements in the computer system 100. The external memory 104 is a storage device, e.g. a hard disk, for storing graphics data associated with the AR application 114. The video camera 108 is a video capturing device, e.g. a webcam, or a digital video camera, that allows the end-user operating the AR application 114 to capture video frames of the real-world scene. The input device 110 is an end-user controlled input device, e.g. a mouse or keyboard, that allows a user to manipulate various aspects of the AR application 114. The display device 112 may be a cathode-ray tube (CRT), a liquid crystal display (LCD) or any other type of display device.

Figure 2:
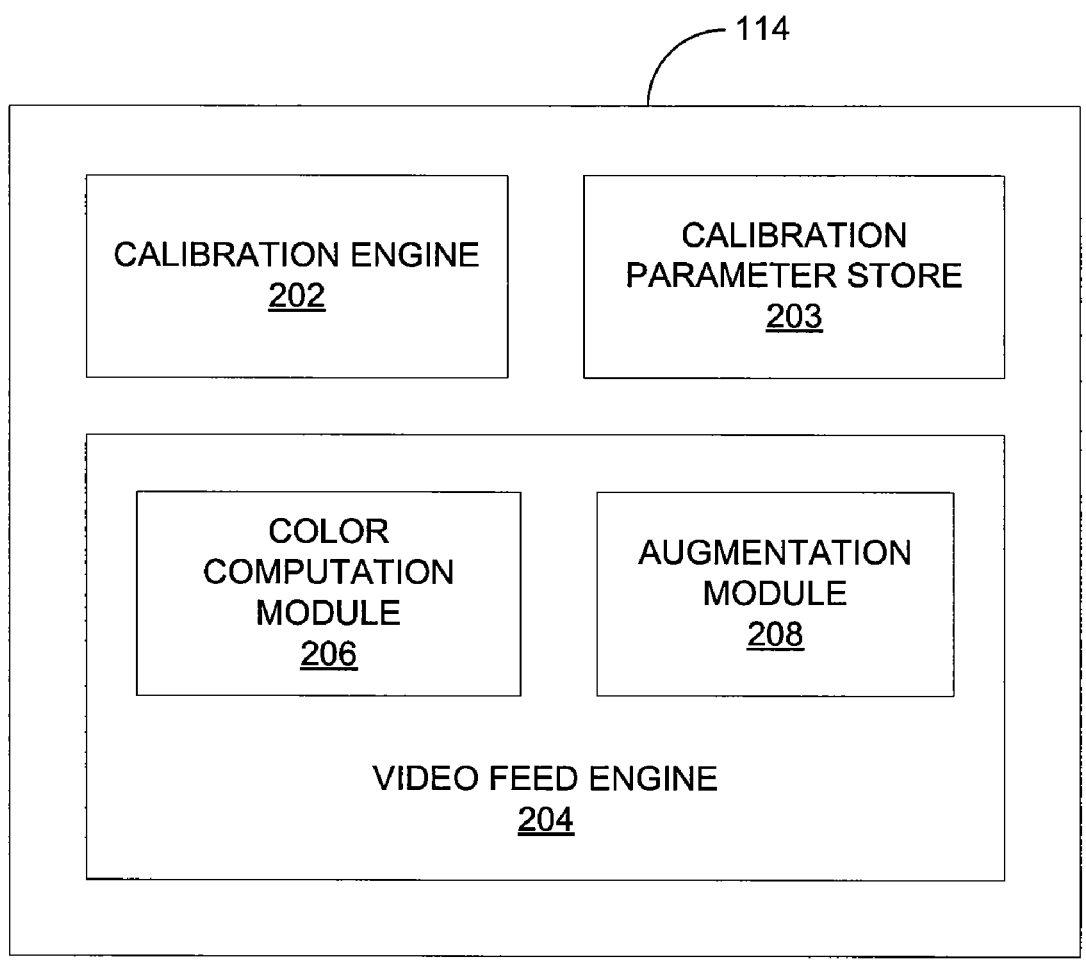
FIG. 2 is a more detailed view of the AR application of FIG. 1, according to one embodiment of the invention.

FIG. 2 is a more detailed view of the AR application 114 of FIG. 1, according to one embodiment of the invention. The AR application 114 includes a calibration engine 202, a calibration parameter store 203 and a video feed engine 204. The video feed engine 204 includes a color computation module 206 and an augmentation module 208.

The calibration engine 202 communicates with the video camera 108 via the video camera driver 116 to determine values of video parameters associated with the video camera 108. In one embodiment, the calibration engine 202 determines how the video camera 108 interprets different colors within a real-world scene based on a fiducial marker placed in the real-world scene. As is well known, a fiducial marker is a physical object manually placed in the real-world scene that is used as a point of reference by the AR application 114. In such an embodiment, the calibration engine 202 first determines the range of light intensities captured by the video camera 108 from a white portion of a fiducial marker placed in the real-world scene. The calibration engine 202 then determines the range of light intensities captured by the video camera 108 from a black portion of a fiducial marker placed in the real-world scene. Based on the range of light intensities associated with the white portion and the range of light intensities associated with the black portion, the calibration engine 202 computes calibrated light intensities captured by the video camera 108 for different colors in the color spectrum. The calibrated light intensities are stored by the calibration engine 202 in the calibration parameter store 203.

Once the video camera is calibrated by the calibration engine 202, a video feed of the real-world scene including the fidicial marker captured by the video camera 108 can be digitally enhanced by the AR application 114. A video feed comprises a series of video frames representing the real-world scene, where each video frame is associated with a frame of video data. When digitally enhancing the video feed, the AR application 114 inserts one or graphics objects into the video frames of the video feed at location denoted by the fiducial markers. The AR application 114 also determines the shading and lighting properties of the graphics object based on the lighting conditions of the real-world scene captured in the video feed.

When determining shading and lighting properties of a graphics object being inserted into a given video frame of the video feed, the video feed engine 204 within the AR application 114 first analyzes the frame of video data associated with the video frame to determine the location of the fiducial marker captured in the video frame. As previously described, the location of the fiducial marker denotes the location in the video frame where the graphics object should be inserted. The color computation module 206 within the video feed engine 204 first determines the light intensities associated with different points on the fiducial marker as specified by the frame of video data associated with the video frame (referred to herein as the "captured light intensities"). The color computation module 206 then computes light color values associated with the different points based on the captured light intensities and the calibrated light intensities stored in the calibration parameter store 203.

The color computation module 206 also computes the direction of light cast on the fiducial marker within the real-world scene. To compute the direction of the light, the color computation module 206 first analyzes the video frame to determine the location of a shadow cast by an object placed on the fiducial marker within the scene. The location of the shadow cast can be determined by analyzing light intensity values at multiple points surrounding the fiducial marker. The direction of the light cast on the fiducial marker is then computed based on the location of the shadow. Persons skilled in the art will recognize that the light color values and the direction of light may be computed in any technically feasible manner. The color computation module 206 then transmits the computed light color values and the direction of light to the augmentation module 208 within the video feed engine 204.

The augmentation module 208 shades the graphics object based on the light color values and the direction of light received from the color computation module 206. The graphics object can be shaded using well-known shading algorithms such as the Phong shading algorithm or the Gouraud shading algorithm. The augmentation module 208 then inserts the shaded graphics object into the video frame at the location of the fiducial marker thereby augmenting the video frame. The augmentation module 208 transmits the augmented video frame to the display device 112 via the graphics driver 118 for display and/or to the external memory 104 for storage.

Figure 3A:
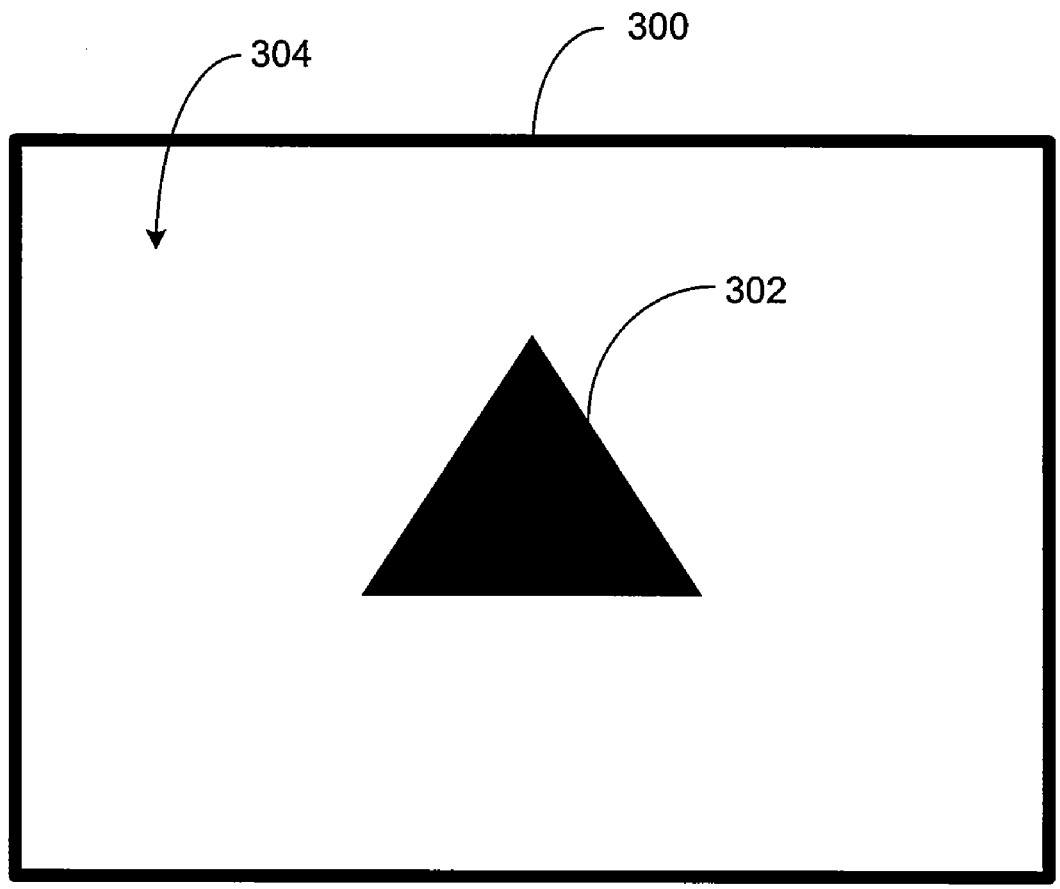
FIG. 3A is an illustration of a fiducial marker, according to one embodiment of the invention.

FIG. 3A is an illustration of a fiducial marker 300, according to one embodiment of the invention. As shown, the fiducial marker 300 includes a black portion 302 placed at the center of the fiducial marker 300 and a white portion 304 surrounding the black portion 302. People skilled in the art will recognize that the fiducial marker 300 is an exemplary fiducial marker in one embodiment of the invention. Other embodiments may contemplate different shaped fiducial markers with alternate placements of white portions and dark portions. Thus, FIG. 3A is in no way intended to limit the scope of the present invention in any way.

Figure 3B:
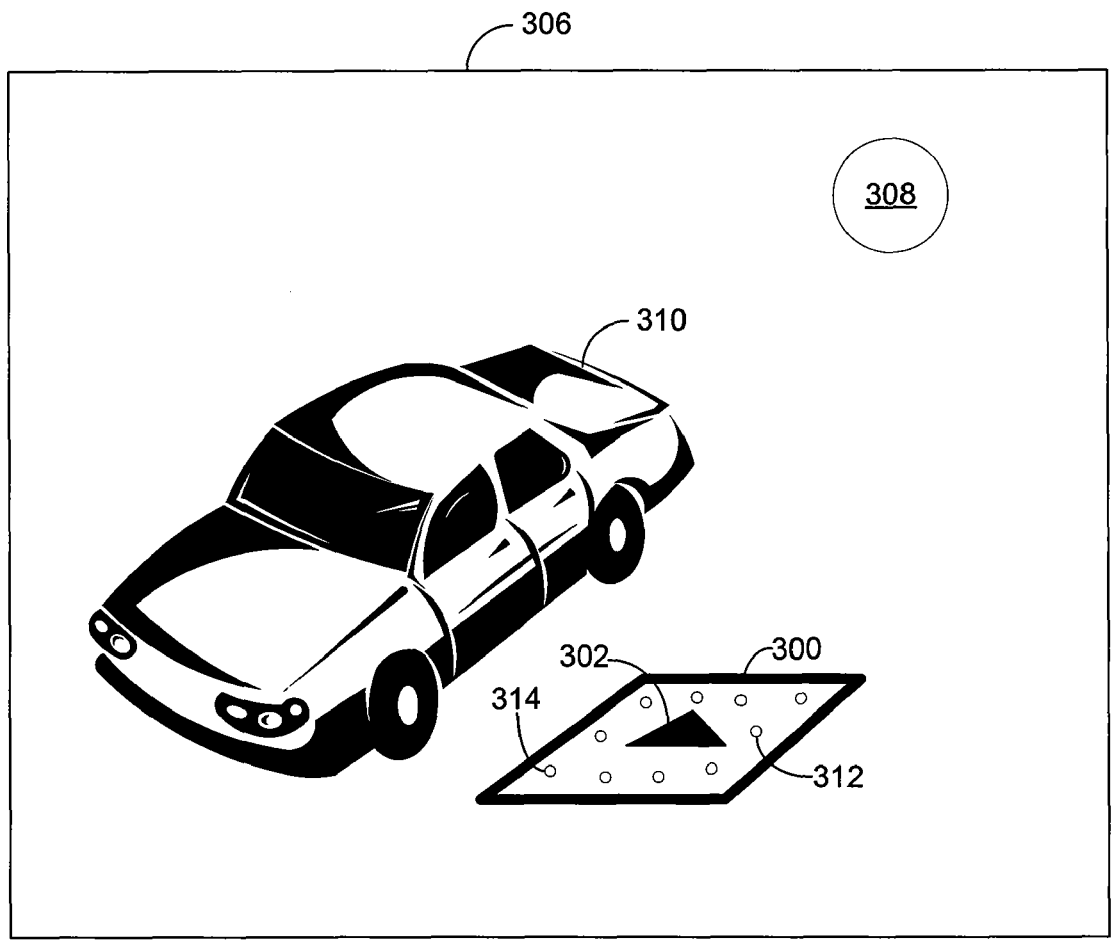
FIG. 3B is an illustration of a set up in a real-world scene for computing lighting values on the fiducial marker, according to one embodiment of the invention.

FIG. 3B is an illustration of a set up in a real-world scene 306 for computing light color values on the fiducial marker 300, according to one embodiment of the invention. As shown, the real-world scene 306 includes a light source 308, a real-world object 310, and the fiducial marker 300 placed at a location in the real-world scene where a graphics object is inserted by the AR application 114. As previously described herein, when the video frame of a video feed of the real-world scene 306 captured by the video camera 108 is processed by the video feed engine 204, the location of the fiducial marker 300 in the video frame is determined. The color computation module 206 within the video feed engine 204 then computes light color values for the fiducial marker 300 at different points on the fiducial marker, such as points 312 and 314 on the fiducial marker 300, based on the light emitted by the light source 308.

Figure 3C:
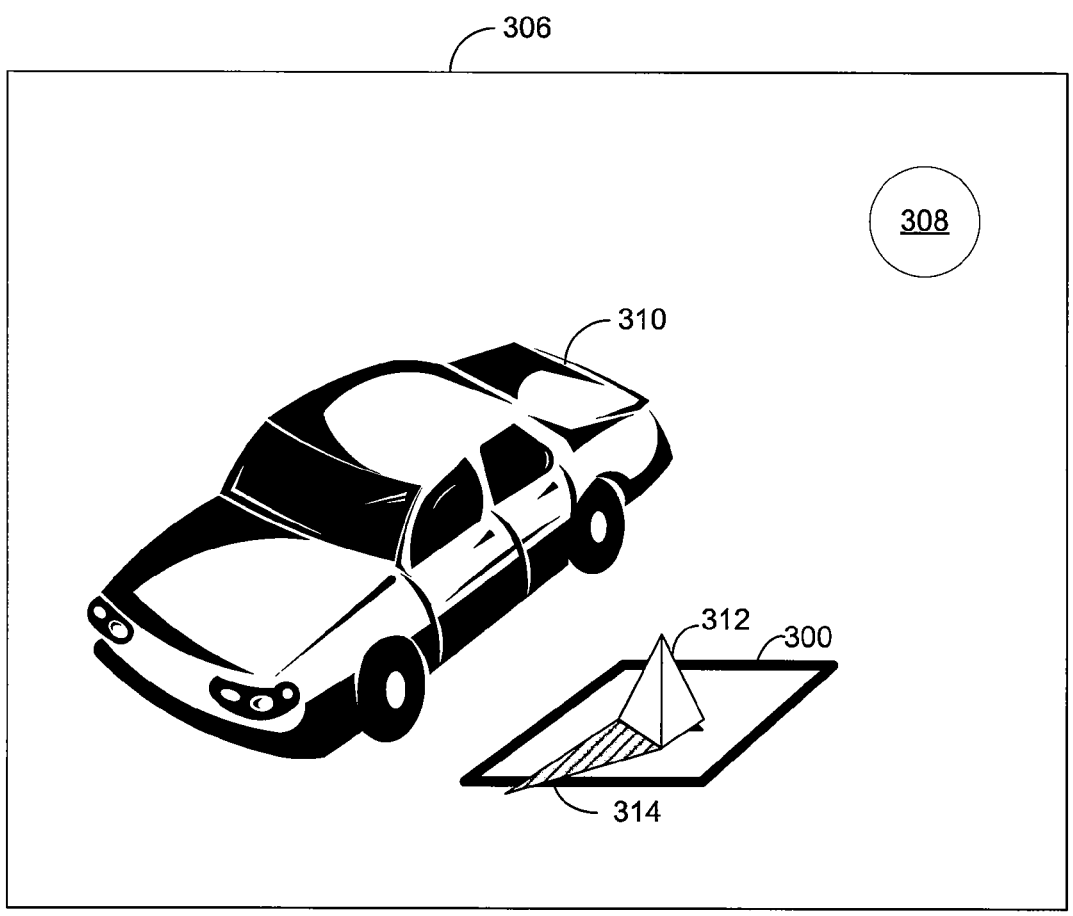
FIG. 3C is an illustration of a set up in a real-world scene for computing the direction of light cast on the fiducial marker, according to one embodiment of the invention.

FIG. 3C is an illustration of a set up in the real-world scene 306 for computing the direction of light cast on the fiducial marker 300, according to one embodiment of the invention. As shown, the real-world scene 306 includes a pyramid object 312 placed on top of the fiducial marker 300. The pyramid object 312 casts a shadow 314 in the real-world scene 306 based on the light emitted from the light source 308. As previously described herein, the color computation module 206 computes the direction of light cast on the fiducial marker 300 based on the shadow 314 cast by the pyramid object 312.

Figure 3D:
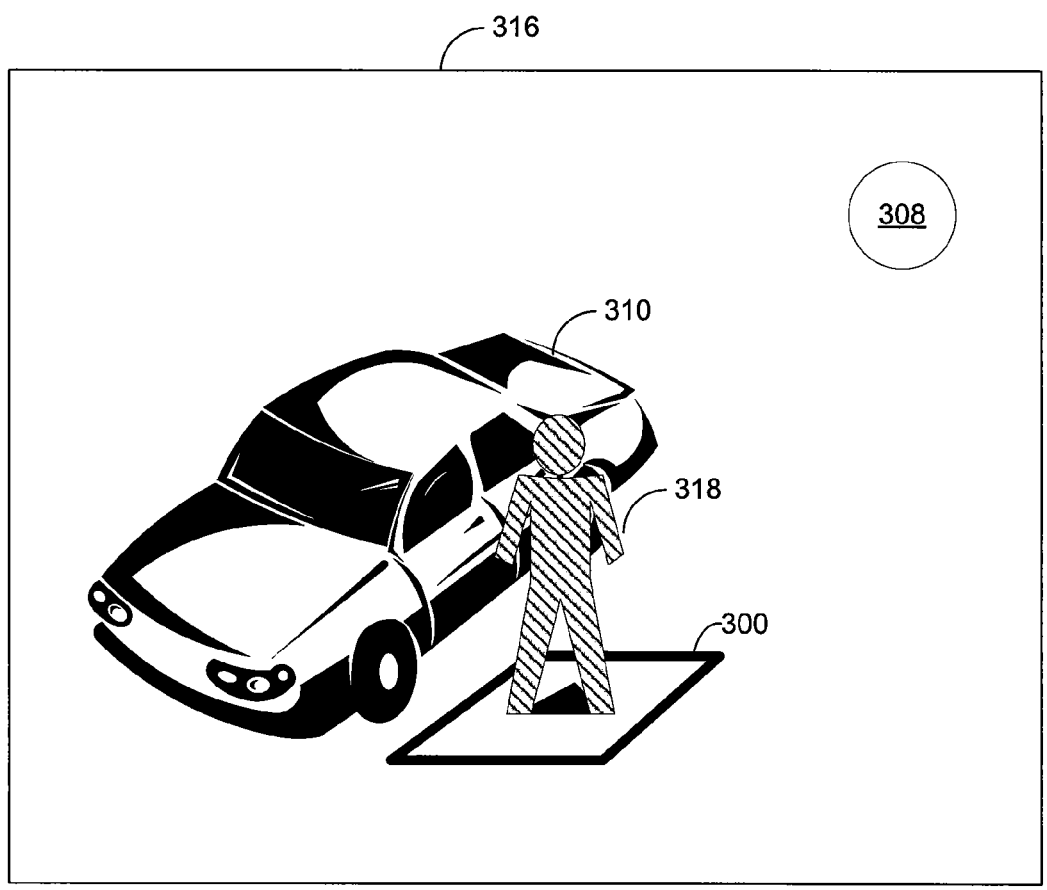
FIG. 3D is an illustration of an augmented video frame of a video feed capturing the real-world scene, according to one embodiment of the present invention.

FIG. 3D is an illustration of an augmented video frame 316 of a video feed capturing the real-world scene 306, according to one embodiment of the present invention. As shown, the video frame 316 includes a graphics object 318 inserted by the augmentation module 208 into the video feed. As previously described, the augmentation module 208 augments the video feed received from the video camera 108 by inserting the graphics object 318 at the location denoted by the fiducial marker 300. The augmentation module 208 also shades the graphics object 318 based on the light color values and the direction of the light computed by the color computation module 206 (as described in FIGS. 2, 3B and 3C).

FIG. 4 is a flowchart of method steps for shading a graphics object by computing light color values and direction of light cast on a fiducial marker within a real-world scene, according to one embodiment of the invention. Although the method steps are described in conjunction with the systems of FIGS. 1-3D, persons skilled in the art will understand that any system configured to perform the method steps, in any order, is within the scope of the inventions.

The method 400 begins at step 402, where the calibration engine 202 within the AR application 114 calibrates the video camera 108 by determining values of video parameters associated with the video camera 108. The values for the video parameters are stored in the calibration parameter store 203. As previously described, in one embodiment, the calibration engine 202 calibrates the video camera 108 by determining the range of light intensities captured by the video camera for different colors. Persons skilled in the art will recognize that video camera calibration can be performed in any technically feasible manner.

At step 404, the video feed engine 204 receives a video frame of a video feed of the real-world scene 306 from the video camera 108 via the video camera driver 116. At step 406, the video feed engine 204 determines the location of the fiducial marker 300 within the video frame based on the frame of video data associated with the video frame. As previously described herein, the fiducial marker denotes the location in the video frame where the graphics object should be inserted. Once the location of the fiducial marker 300 is determined, at step 408, the color computation module 206 within the video feed engine 204 computes light color values at different points on the fiducial marker 300. The light color values are computed based on the light intensities captured by the video camera 108 at the different points and the calibrated light intensities stored in the calibration parameter store 203. At step 410, the color computation module 206 also computes the direction of light cast on the fiducial marker 300 by determining the direction of the shadow 314 cast by the pyramid object 312 placed on the fiducial marker 300. The color computation module 206 then transmits the computed light color values and the direction of light to the augmentation module 208 within the video feed engine 204.

At step 412, the augmentation module 208 modifies the lighting properties of the graphics object 318 to be inserted into the video frame based on the light color values and the direction of light computed by the color computation module 206. The lighting properties of the graphics object 318 can be modified using well-known shading algorithms such as the Phong shading algorithm, the Blinn shading algorithm or the Gouraud shading algorithm. At step 414, the augmentation module 208 inserts the graphics object 318 into the video frame at the location of the fiducial marker thereby augmenting the video frame. At step 416, the augmentation module 208 transmits the augmented video frame to the display device 112 via the graphics driver 118 for display.

In sum, the augmented reality application shades a graphics object inserted into a video frame of a video feed capturing a real-world scene based on lighting conditions in the real-world scene. In order to shade the graphics object, the augmented reality application performs three operations, calibrating the video camera, computing light color values on different points on the fiducial marker present in the video feed, and computing the direction of light cast on the fiducial marker.

When calibrating the video camera, the calibration engine within the augmented reality application first determines the range of light intensities captured by the video camera from a white portion of the fiducial marker and a black portion of the fiducial marker. The calibration engine then determines how the video camera interprets different colors based on the range of light intensities. Once the video camera is calibrated, video feed captured by the video camera can be processed by the video feed engine in the augmented reality application.

When processing video feed captured from the video camera, the video feed engine first determines the location of the fiducial marker in the video feed. The fiducial marker denotes the location in the video feed where the graphics object generated by the augmented reality application should be placed. The color computation module within the video feed engine then computes light color values at multiple points on the fiducial marker based on the range of intensities determined by the calibration engine. The color computation module also computes the direction of light cast on the fiducial marker by determining the direction of the shadow cast by a pyramid object on the fiducial marker. The color computation module then transmits the light color values and the direction of light to the augmentation module within the video feed engine. The augmentation module shades the graphics object inserted into the video feed at the location of the fiducial marker based on the light color values and the direction of light.

One advantage of the disclosed technique is that the video feed engine processes the video feed only once to compute lighting conditions, i.e., light color values and the direction of light cast on the fiducial, and inserted the graphics object into the video feed. Another advantage is that no specialized hardware is required to compute the lighting conditions. The set-up of the real-world scene in the disclosed technique only needs the fiducial marker and any object that can be placed on top of the fiducial marker to cast a shadow.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for lighting a graphics object inserted into a video image of a real-world scene that includes a fiducial marker and a light source emitting light on the fiducial marker, the method comprising:
analyzing video data associated with the video image to determine a location of the fiducial marker within the real-world scene;
computing a color value associated with the light emitted at a first point on the fiducial marker based on a light intensity value associated with the first point and specified by the video data;
determining a location of a real-world shadow captured by the video image and cast by an object placed on the fiducial marker within the real-world scene by analyzing one or more light intensity values associated with a set of points surrounding the fiducial marker and specified by the video data;
computing a direction of the emitted light based on the location of the real-world shadow cast by the object; and
modifying one or more lighting properties associated with the graphics object based on the color value of the light emitted at the first point and the direction of the emitted light.

2. The method of claim 1, further comprising the step of calibrating a video camera that captures the video image to determine a set of calibrated color values.

3. The method of claim 2, wherein the step of computing the color value is further based on the set of calibrated color values.

4. The method of claim 1, further comprising the step of inserting the graphics object into the video image at a location corresponding to the location of the fiducial marker within the real-world scene.

5. The method of claim 4, further comprising the step of transmitting the video image to a display device for display or to a storage device for storage.

6. The method of claim 1, wherein the object placed on the fiducial marker comprises a pyramid.

7. The method of claim 1, further comprising the step of computing a second color value associated with the light emitted at a second point on the fiducial marker based on a second light intensity value associated with the second point and specified by the video data.

8. The method of claim 7, wherein the step of modifying the one or more lighting properties is further based on the second color value of the light at the second point.

9. A non-transitory computer-readable storage medium storing instruction that, when executed by a processor, cause a computing system to light a graphics object inserted into a video image of a real-world scene that includes a fiducial marker and a light source emitting light on the fiducial marker, by performing the steps of:
analyzing video data associated with the video image to determine a location of the fiducial marker within the real-world scene;
computing a color value associated with the light emitted at a first point on the fiducial marker based on a light intensity value associated with the first point and specified by the video data;
determining a location of a real-world shadow captured by the video image and cast by an object placed on the fiducial marker within the real-world scene by analyzing one or more light intensity values associated with a set of points surrounding the fiducial marker and specified by the video data;
computing a direction of the emitted light based on the location of the real-world shadow cast by the object; and
modifying one or more lighting properties associated with the graphics object based on the color value of the light emitted at the first point and the direction of the emitted light.

10. The computer-readable storage medium of claim 9, further comprising the step of calibrating a video camera that captures the video image to determine a set of calibrated color values.

11. The computer-readable storage medium of claim 10, wherein the step of computing the color value is further based on the set of calibrated color values.

12. The computer-readable storage medium of claim 9, further comprising the step of inserting the graphics object into the video image at a location corresponding to the location of the fiducial marker within the real-world scene.

13. The computer-readable storage medium of claim 12, further comprising the step of transmitting the video image to a display device for display or to a storage device for storage.

14. The computer-readable storage medium of claim 9, wherein the object placed on the fiducial marker comprises a pyramid.

15. The computer-readable storage medium of claim 9, further comprising the step of computing a second color value associated with the light emitted at a second point on the fiducial marker based on a second light intensity value associated with the second point and specified by the video data.

16. The computer-readable storage medium of claim 15, wherein the step of modifying the one or more lighting properties is further based on the second color value of the light at the second point.

17. A computer system for lighting a graphics object inserted into a video image of a real-world scene that includes a fiducial marker and a light source emitting light on the fiducial marker, the computer system comprising:
a processor; and
a memory storing instructions that when executed by the processor are configured to:
analyze video data associated with the video image to determine a location of the fiducial marker within the real-world scene;
compute a color value associated with the light emitted at a first point on the fiducial marker based on a light intensity value associated with the first point and specified by the video data;
determine a location of a real-world shadow captured by the video image and cast by an object placed on the fiducial marker within the real-world scene by analyzing one or more light intensity values associated with a set of points surrounding the fiducial marker and specified by the video data;
compute a direction of the emitted light based on the location of the real-world shadow cast by the object; and
modify one or more lighting properties associated with the graphics object based on the color value of the light emitted at the first point and the direction of the emitted light.

18. The computer system of claim 17, wherein the instructions are further configured to calibrate a video camera that captures the video image to determine a set of calibrated color values.

19. The computer system of claim 18, wherein computing the color value is further based on the set of calibrated color values.

20. The computer system of claim 17, wherein the instructions are further configured to insert the graphics object into the video image at a location corresponding to the location of the fiducial marker within the real-world scene.

* * * * *